(12) United States Patent
Zhou et al.

(10) Patent No.: US 11,544,001 B2
(45) Date of Patent: Jan. 3, 2023

(54) METHOD AND APPARATUS FOR TRANSMITTING DATA PROCESSING REQUEST

(71) Applicant: HUAWEI TECHNOLOGIES CO., LTD., Shenzhen (CN)

(72) Inventors: Jianhua Zhou, Chengdu (CN); Meng Zhou, Shenzhen (CN); Kun Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 16/810,372

(22) Filed: Mar. 5, 2020

(65) Prior Publication Data

US 2020/0201579 A1 Jun. 25, 2020

Related U.S. Application Data

(63) Continuation of application No. PCT/CN2018/104095, filed on Sep. 5, 2018.

(30) Foreign Application Priority Data

Sep. 6, 2017 (CN) .......................... 201710803285.6

(51) Int. Cl.
G06F 3/06 (2006.01)
(52) U.S. Cl.
CPC .......... *G06F 3/0659* (2013.01); *G06F 3/0604* (2013.01); *G06F 3/067* (2013.01)

(58) Field of Classification Search
CPC ....... G06F 3/0659; G06F 3/0604; G06F 3/067
See application file for complete search history.

(56) References Cited

U.S. PATENT DOCUMENTS

| 7,451,341 B2 * | 11/2008 | Okaki | G06F 11/201 714/4.1 |
| 2004/0049553 A1 * | 3/2004 | Iwamura | H04L 29/12018 709/213 |
| 2007/0083725 A1 | 4/2007 | Kasiolas et al. | |
| 2009/0172211 A1 | 7/2009 | Perry et al. | |
| 2009/0259749 A1 * | 10/2009 | Barrett | G06F 11/3495 709/224 |

(Continued)

FOREIGN PATENT DOCUMENTS

| CN | 101539874 A | 9/2009 |
| CN | 102546820 A | 7/2012 |

(Continued)

*Primary Examiner* — Charles Rones
*Assistant Examiner* — Han V Doan
(74) *Attorney, Agent, or Firm* — Stein IP, LLC

(57) ABSTRACT

A first storage node is connected to a host by using a first network interface card of the first storage node, and is connected to a second storage node by using a second network interface card. The first storage node receives a data processing request from the host, wherein the data processing request carries a target storage address of to-be-processed data, determines the second storage node based on the target storage address of the to-be-processed data, and sends the data processing request to the second storage node by using the second network interface card, wherein the data processing request instructs the second storage node to process the to-be-processed data.

16 Claims, 7 Drawing Sheets

(56) References Cited

U.S. PATENT DOCUMENTS

2013/0339567 A1* 12/2013 Carpentier ............ G06F 3/0607
 711/4
2014/0122636 A1 5/2014 Peake et al.
2015/0143164 A1 5/2015 Veerla et al.
2015/0244612 A1 8/2015 Yamasaki et al.
2017/0286306 A1 10/2017 Zhou et al.

FOREIGN PATENT DOCUMENTS

| | | |
|---|---|---|
| CN | 103608784 A | 2/2014 |
| CN | 104216664 A | 12/2014 |
| CN | 104503707 A | 4/2015 |
| CN | 104994135 A | 10/2015 |
| CN | 105205067 A | 12/2015 |
| CN | 105516367 A | 4/2016 |
| CN | 105653406 A | 6/2016 |
| CN | 107707628 A | 2/2018 |
| EP | 2711841 A1 | 3/2014 |
| JP | 2015162037 A | 9/2015 |

* cited by examiner

METHOD AND APPARATUS FOR TRANSMITTING DATA PROCESSING REQUEST

CROSS-REFERENCE TO RELATED APPLICATIONS

This application is a continuation of International Application No. PCT/CN2018/104095, filed on Sep. 5, 2018, which claims priority to Chinese Patent Application No. 201710803285.6, filed on Sep. 6, 2017. The disclosures of the aforementioned applications are hereby incorporated by reference in their entireties.

TECHNICAL FIELD

Aspects of this application relate to the communications field, and more specifically, to a method and an apparatus for transmitting a data processing request.

BACKGROUND

As a size of data gradually increases, a requirement of people for a storage device is increasing. To meet the requirement of people for the storage device, network storage becomes a common data storage manner in a current storage system. A special dedicated data storage system is defined in a network storage technology. A cross-platform file sharing function can be implemented in the storage system. Specifically, network storage forms include direct attached storage (DAS), network attached storage (NAS), a storage area network (SAN), and the like.

The storage system based on the network storage technology may include a plurality of storage nodes, and the plurality of storage nodes may access, by using a first network interface card disposed inside the storage node, a network to be connected to a host. In other words, in the storage system, the host may access a storage device in any storage node by using the network. When the host needs to access a storage device in a storage node (namely, a second storage node) in the storage system, the host needs to access the storage device in the second storage node through an access path formed by hardware devices such as a central processing unit (CPU) in the second storage node and a first network interface card of the second storage node.

However, if the storage device of the second storage node can be accessed only through the access path formed by the CPU of the second storage node and the first network interface card in the second storage node, when the CPU of the second storage node cannot process a data access request in a timely manner, the host cannot access the second storage node in a timely manner, or when the access path on the second storage node is faulty, the host cannot access the storage device of the second storage node.

SUMMARY

This application provides a method and an apparatus for transmitting a data processing request, to improve a success rate of accessing a storage device in a second storage node.

According to a first aspect, a method for transmitting a data processing request is provided, and is applied to a storage system, where the storage system includes a first storage node and a second storage node, a storage device in the first storage node is connected to a host by using a processor and a first network interface card of the first storage node, and is connected to a storage device of the second storage node by using a second network interface card, and the method includes: receiving, by the first storage node, a data processing request to access the storage device of the second storage node, where the data processing request carries a target storage address of to-be-processed data; determining, by the first storage node, the second storage node based on the target storage address of the to-be-processed data; and sending, by the first storage node, the data processing request to the second storage node by using the second network interface card, where the data processing request instructs the second storage node to process the to-be-processed data.

In this embodiment of this application, the data processing request may be processed in the first storage node, and the processed data processing request is sent to a switching unit in the second storage node by using a switching unit in the first storage node, to access the storage device in the second storage node, thereby avoiding a problem that a storage device corresponding to a target storage address can be accessed only through an access path inside the second storage node in the prior art, and improving a success rate of accessing the target storage address in the second storage node.

With reference to the first aspect, in a possible manner of the first aspect, the target storage address includes an identifier of the second storage node and a logical address that is in the storage device of the second storage node and that is used to store the to-be-processed data.

The identifier of the storage node is directly carried in the target address, so that the first storage node can directly determine the second storage node based on the target address, thereby simplifying complexity of determining the second storage node by the first storage node.

With reference to the first aspect, in a possible manner of the first aspect, the storage system includes a plurality of storage nodes, and storage address ranges corresponding to different storage nodes in the plurality of storage nodes are not overlapped; and the determining, by the first storage node, the second storage node based on the target storage address of the to-be-processed data includes: determining, by the first storage node based on the target storage address, a storage address range to which the target storage address belongs; and determining, by the first storage node, the second storage node based on the storage address range to which the target storage address belongs and a correspondence between a storage address range in the storage system and a storage node in the storage system.

The target storage address is carried only in the data processing request. This helps reduce overheads caused by signaling transmission.

With reference to the first aspect, in a possible manner of the first aspect, the storage system includes a plurality of storage nodes, and identifiers of storage devices in different storage nodes in the plurality of storage nodes are different. The data processing request carries an identifier of a storage device in which the target storage address of the to-be-processed data is located. The determining, by the first storage node, the second storage node based on the target storage address of the to-be-processed data further includes: determining, by the first storage node based on the target storage address, a storage device corresponding to the target storage address, and determining, by the first storage node, the second storage node based on an identifier of the storage device corresponding to the target storage address and a correspondence between an identifier of a storage device and a storage node in the storage system.

With reference to the first aspect, in a possible manner of the first aspect, the method further includes: receiving, by the first storage node, the correspondence that is between a storage address range in the storage system and a storage node in the storage system and that is sent by the host.

According to a second aspect, a method for transmitting a data processing request is provided, and is applied to a host. The host is connected to a storage system, the storage system includes at least two storage nodes, each storage node is connected to the host by using a first network interface card, and is connected to another storage node by using a second network interface card. The method includes: obtaining, by the host, a topological relationship of storage nodes connected by using the second network interface card in the storage system; when a preset condition is detected, determining, by the host, a first storage node in the at least two storage nodes based on the topological relationship, where the host accesses a second storage node by using the first storage node; and sending, by the host to the first storage node, a data processing request used to access a storage device of the second storage node.

In this embodiment of this application, the data processing request may be processed in the first storage node, and the processed data processing request is sent to a switching unit in the second storage node by using a switching unit in the first storage node, to access the storage device in the second storage node, thereby avoiding a problem that a storage device corresponding to a target storage address can be accessed only through an access path inside the second storage node in the prior art, and improving a success rate of accessing the target storage address in the second storage node.

With reference to the second aspect, in a possible implementation of the second aspect, the method further includes: sending, by the host, a correspondence between a storage address range in the storage system and a storage node in the storage system to the first storage node.

According to a third aspect, an apparatus for transmitting a data processing request is provided. The apparatus includes modules configured to perform any one of the first aspect or the possible implementations of the first aspect.

According to a fourth aspect, an apparatus for transmitting a data processing request is provided. The apparatus includes modules configured to perform any one of the second aspect or the possible implementations of the second aspect.

According to a fifth aspect, an apparatus for transmitting a data processing request is provided, including a transceiver, a processor, and a memory. The processor is configured to control the transceiver to send a signal and receive a signal. The memory is configured to store a computer program. The processor is configured to invoke the computer program from the memory and run the computer program, so that the apparatus for transmitting a data processing request performs the method in the first aspect.

According to a sixth aspect, an apparatus for transmitting a data processing request is provided, including a transceiver, a processor, and a memory. The processor is configured to control the transceiver to send a signal and receive a signal. The memory is configured to store a computer program. The processor is configured to invoke the computer program from the memory and run the computer program, so that the apparatus for transmitting a data processing request performs the method in the second aspect.

According to a seventh aspect, a computer program product is provided, and the computer program product includes computer program code. When the computer program code runs on a computer, the computer is enabled to perform the methods in the foregoing aspects.

According to an eighth aspect, a computer readable medium is provided, and the computer readable medium stores program code. When the computer program code runs on a computer, the computer is enabled to perform the methods in the foregoing aspects.

According to a ninth aspect, a chip system is provided. The chip system includes a processor that is used by an apparatus for transmitting a data processing request to implement functions in the foregoing aspects, for example, a function of generating, receiving, sending, or processing data and/or information in the foregoing methods. In a possible design, the chip system further includes a memory. The memory is configured to store a program instruction and data that are necessary for the apparatus for transmitting a data processing request. The chip system may include a chip, or may include a chip and another discrete device.

According to a tenth aspect, a chip system is provided. The chip system includes a processor that is used to support an apparatus for transmitting a data processing request in implementing functions in the foregoing aspects, for example, a function of generating, receiving, sending, or processing data and/or information in the foregoing methods. In a possible design, the chip system further includes a memory. The memory is configured to store a program instruction and data that are necessary for a network device. The chip system may include a chip, or may include a chip and another discrete device.

DESCRIPTION OF EMBODIMENTS

The following describes technical solutions of this application with reference to accompanying drawings.

For ease of understanding, a conventional method for transmitting a data processing request is first briefly described.

Figure 1:
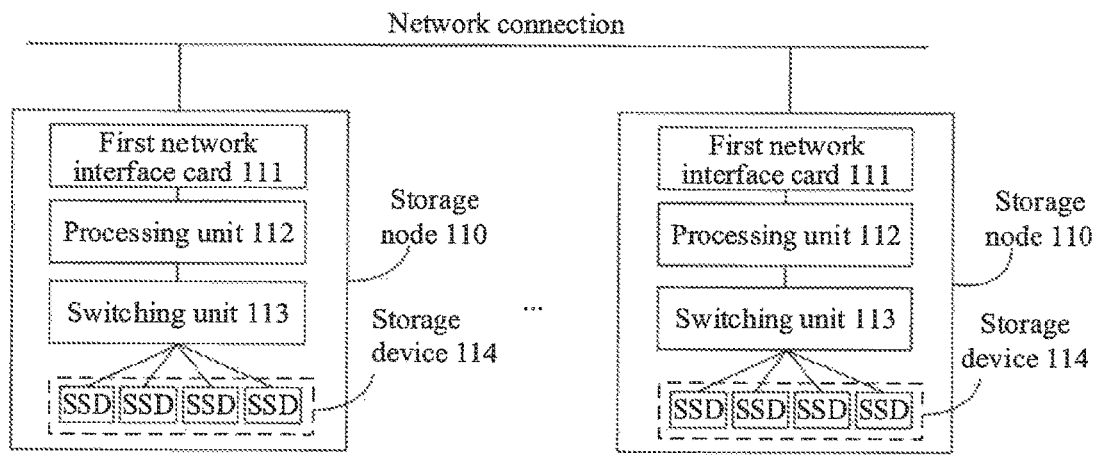
FIG. 1 is a schematic block diagram of a conventional storage system based on a storage network.

FIG. 1 is a schematic block diagram of a conventional storage system based on a storage network. The storage system shown in FIG. 1 includes at least one storage node 110, and one of the storage nodes 110 in the storage system is connected to a network, so that a host accesses a storage device 114 in the storage node 110 in the storage system by using the network.

A storage address corresponding to the storage device 114 in the storage node 110 includes a target storage address that is to be accessed by the host by using the network. The storage node 110 further includes a first network interface card 111, a processing unit 112, and a switching unit 113. The first network interface card 111, the processing unit 112, the switching unit 113, and the storage device 114 are connected through an internal connection path.

The first network interface card 111 is configured to connect the storage node 110 to the network, and may forward, to the processing unit 112, a data processing request sent by the host by using the network.

The processing unit 112 is configured to: process a data processing request received from a network interface, and convert the data processing request into a data processing request that can be directly processed by the storage device 114. For example, when the data processing request is an EC request, the processing unit 112 is configured to: calculate raw data carried in the data processing request, generate a copy of the raw data, and generate an I/O request that can be directly processed by the storage device 114. The I/O request is used to store both the raw data and the copy in the storage device 114. It should be noted that the processing unit 112 may be a CPU.

The switching unit 113 is configured to provide a communication path for the processing unit 112 and a storage device 114 that accesses the switching unit 113, to forward, from the processing unit 112, the data processing request that can be directly processed by the storage device 114 to the storage device 114.

It should be noted that the switching unit 113 may be a switch or a switching chip.

The storage device 114 provides storage space for data storage. Specifically, the storage device 114 may be a storage device including an SSD or a hard disk drive (HDD).

It should be noted that the storage device 114 may be managed by a storage system based on a key value (KV), may be a storage device based on block device management, or may be a storage device based on document storage system management. This is not specifically limited in this embodiment of this application.

In the storage system shown in FIG. 1, an access path that is in the storage node 110 and that is used to access a storage device 114 of the storage node 110 includes the first network interface card 111 and the processing unit 112. In other words, the host can access the storage device 114 of the storage node only through the access path in the storage node. When the access path is faulty (for example, the access path is faulty because of a fault of the processing unit 112) or the access path is congested (for example, congestion caused when the processing unit 112 performs a relatively large amount of calculation on a data processing request), the host may not be able to access the storage device 114 of the storage node 110, or the host needs to wait for a relatively long time to access the storage device 114 of the storage node 110.

To resolve the problem, in a manner of transmitting a data processing request in the embodiments of this application, the storage device 114 of the storage node 110 may be accessed by another storage node 110 in the storage system. For ease of understanding, the storage system in the embodiments of this application is first briefly described.

Figure 2:
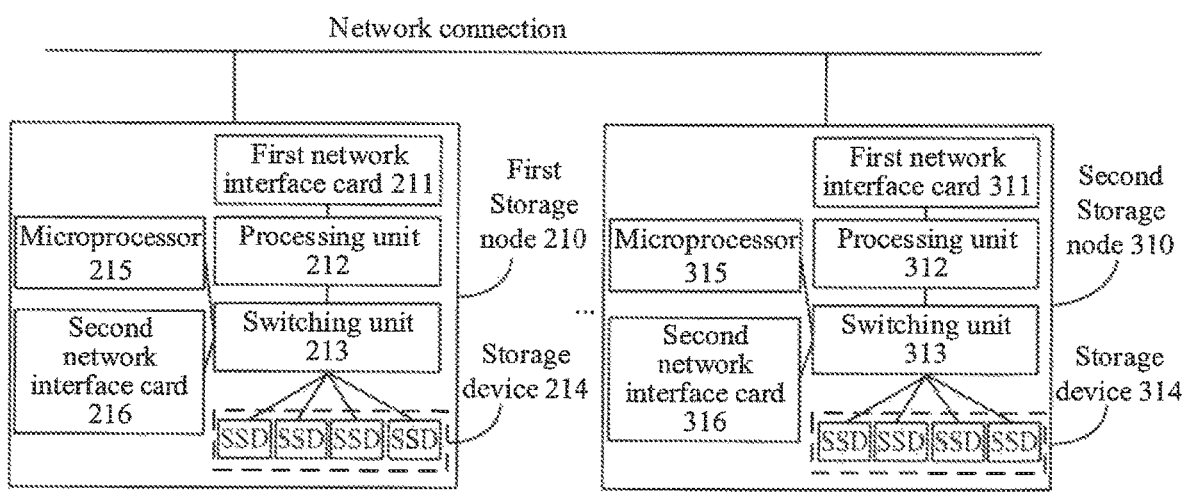
FIG. 2 is a schematic block diagram of a storage system based on a network storage technology according to an embodiment of this application.

FIG. 2 is a schematic block diagram of a storage system based on a network storage technology according to an embodiment of this application. It should be understood that functions of some units in the storage system shown in FIG. 2 are similar to those of some units in the storage system shown in FIG. 1.

The storage system shown in FIG. 2 includes at least two storage nodes, such as a first storage node 210 and a second storage node 310. The first storage node 210 and the second storage node 310 are connected through a network, so that a host accesses a storage device 314 in the second storage node 310 through the first storage node 210, or access a storage device 214 in the first storage node 210 through the second storage node 310.

It should be noted that only units related to this embodiment of this application are listed in the storage system shown in FIG. 2, and units included in another conventional storage system may be further included. This is not specifically limited in this embodiment of this application.

The first storage node 210 includes a first network interface card 211, a processing unit 212, a switching unit 213, a storage device 214, a microprocessor 215, and a second network interface card 216. The second storage node 310 includes a first network interface card 311, a processing unit 312, a switching unit 313, a storage device 314, a microprocessor 315, and a second network interface card 316. The second storage node 210 has the same structure with the first storage node 310, so only the first storage node described below. The first network interface 211, the processing unit 212, the switching unit 213, the storage device 214, the microprocessor 215, and the second network interface card 216 are connected through an internal connection path and have the same functions with the corresponding units of the storage node 110 in FIG. 1, so the function of the above units of the second storage node can referred to the corresponding description of FIG. 1.

The microprocessor 215 is configured to configure the switching unit 113 to ensure that the storage device 214 in the first storage node 210 can be accessed by another storage node, such as the second storage node 310.

The second network interface card 216 is configured to connect the first storage node 210 to the second storage node 310 through a network.

It should be noted that the network for connecting the first storage node 210 and the second storage node 310 by the second network interface card 212 may be the same as a network for connecting the first storage node 210 and the host by using the first network interface card 111. In other words, the first storage node 210 may access the second storage node 310 [is this network interface card different from the one shown in FIG. 1 since the reference numerals are different?] through the network for connecting the first storage node 210 and the host.

The network for connecting the first storage node 210 and the second storage node 310 by the second network interface card 216 may be different from the network for connecting the first storage node 210 and the host. In other words, the first storage node 210 may separately access two independent networks by using the first network interface card 211 and the second network interface card 216.

It should be noted that the second network interface card 216 may be a device that establishes a communications connection between the first storage node 210 and the second storage node 310 of the storage system. In different networks, the second network interface card 216 may be different. Alternatively the second network interface card 216 may be network interface card that supports a corresponding network protocol.

For example, in a network based on a small computer system interface (SCSI), the second network interface card 216 may be a host bus adapter (HBA). The HBA is a circuit board or an integrated circuit adapter that provides input/output (I/O) processing and a physical connection between a server and a storage apparatus, namely, an I/O adapter that connects a host I/O bus to a storage system of a computer.

In a network based on a fibre channel (FC), the second network interface card 216 may be a network adapter, and is configured to connect the first storage node to a local area network. The second network interface card 216 may be further configured to encapsulate to-be-transmitted data into the data in a format that can be identified by another device in the network, to transmit the data by using a network medium. Specifically, the second network interface card 216 may be an Ethernet network interface card, an FC network interface card, an Internet Small Computer System Interface (ISCSI) network interface card, or the like.

Figure 3:
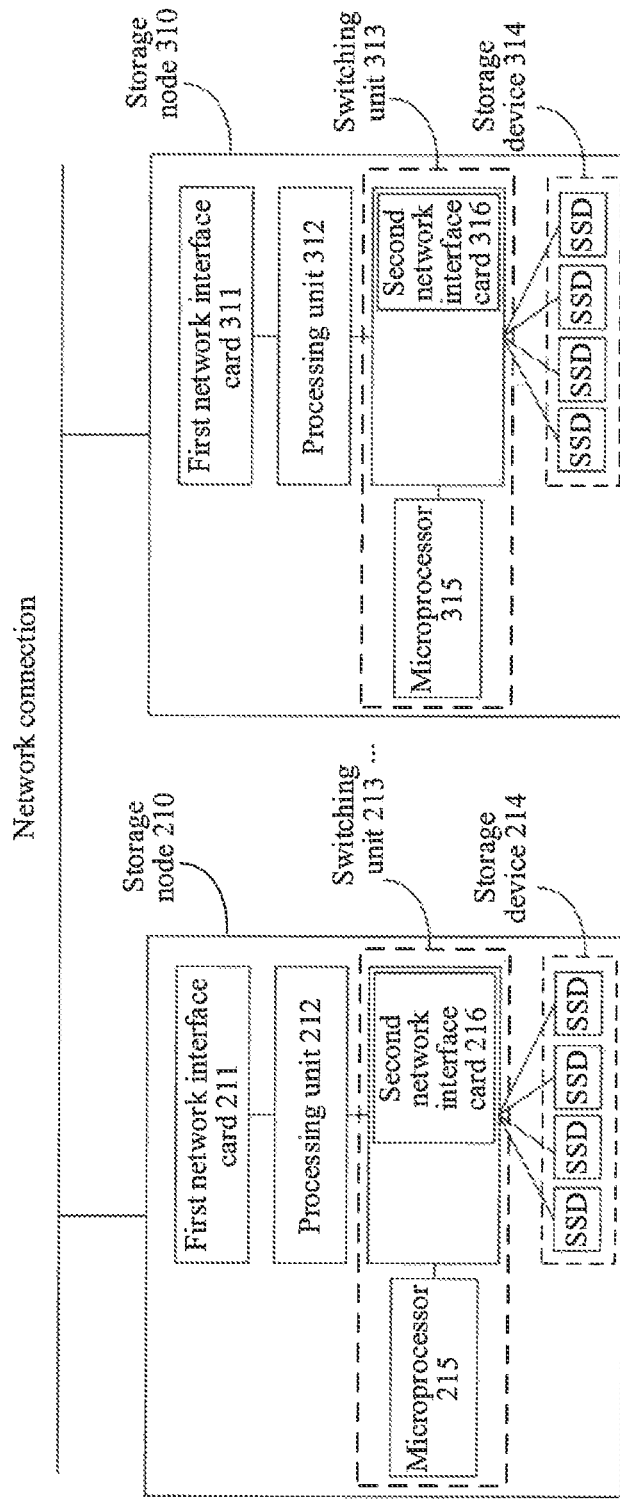
FIG. 3 is a schematic block diagram of a storage system based on a network storage technology according to another embodiment of this application.

It should be understood that the second network interface card 216 and the switching unit 213 in the storage node shown in FIG. 2 may be physical units independent of each other. The second network interface card 216 may alternatively be a function module located inside the switching unit 213. For a specific structural diagram, refer to FIG. 3. FIG. 3 is a schematic block diagram of a storage system based on a network storage technology according to another embodiment of this application.

It should be further understood that the switching unit 213 and the microprocessor 215 may be physical units independent of each other. For a specific schematic structural diagram, refer to FIG. 2. Alternatively, the microprocessor 215 may be integrated to the switching unit 213. For a specific schematic structural diagram, refer to a FIG. 3.

Figure 4:
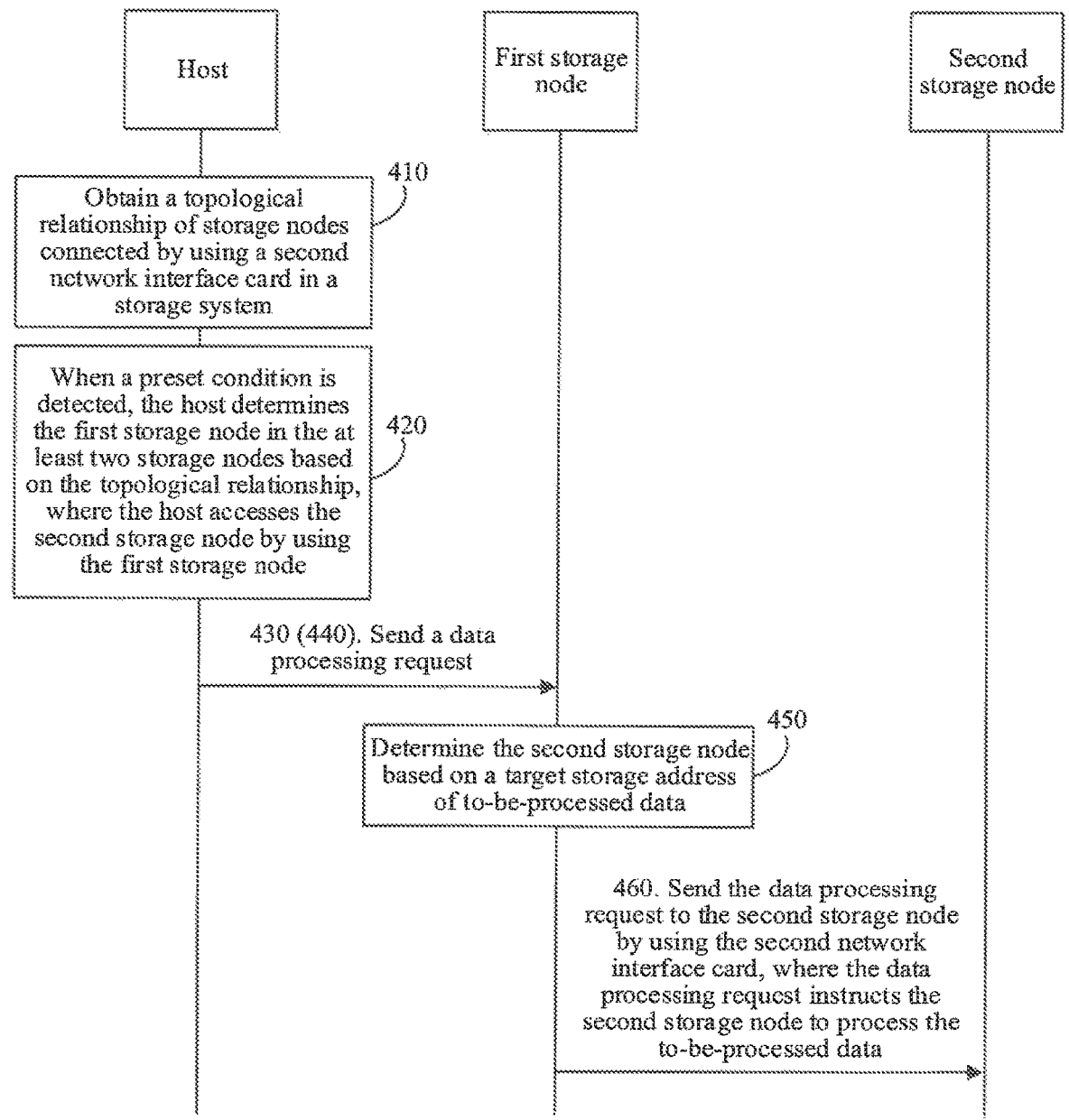
FIG. 4 is a schematic flowchart of a method for transmitting a data processing request according to an embodiment of this application.

Based on the schematic block diagrams of the foregoing storage systems shown in FIG. 2 and FIG. 3, a method for transmitting a data processing request in the embodiments of this application is described below in detail with reference to FIG. 4. FIG. 4 is a schematic flowchart of a method for transmitting a data processing request according to an embodiment of this application. As shown in FIG. 4, the method includes the following steps.

410. The host obtain a topological relationship of storage nodes in the storage system.

420. When a preset condition is detected, the host determines the first storage node 216 in the at least two storage nodes based on the topological relationship, where the host accesses the second storage node 316 by using the first storage node 216.

Specifically, when a storage device of the second storage node 316 is accessed by using the first storage node 216, it may indicate that the storage device 314 of the second storage node 310 is accessed by using a network for connecting the second network interface card 216 of the first storage node 210 and the second network interface card 316 of the second storage node 310.

Optionally, the host determines, based on the topological relationship and a preset rule, the first storage node 210, to access the storage device 314 of the second storage node 310. The preset rule is a rule for instructing the host to determine the first storage node 210.

The preset rule may be any one of the following rules.

1. The host determines the first storage node 210 based on a feedback delay of a storage node in a current time period.

Specifically, the host may send a data processing request to storage nodes in the storage system in the current time period, and determine the spend time between the time when the data processing request is to be sent and the time when the indication information which indicates successful execution of the data processing request is returned, and select a storage node with a relatively short spend time as the first storage node, to reduce, to some extent, a time used by the first storage node 210 to forward a data processing request to the second storage node.

2. The host determines the first storage node 210 based on a location relationship between storage nodes in the storage system.

Specifically, the host may obtain location information of each storage node in the storage system, and determine a storage node closest to a location of the second storage node 310 as the first storage node 210.

430. The host sends, to the first storage node 210, a data processing request used to access the storage device 314 of the second storage node 310.

Optionally, in an embodiment, before step 430, the method further includes: determining that an access path of a storage node in which the target storage address is located is faulty or congested.

It should be noted that, if the data processing request is sent to the storage node in which the target storage address is located, and feedback that is specific to the data processing request and that is sent by the storage node in which the storage address is located is not received in a preset time period, it may be determined that the access path of the storage node in which the target storage address is located is faulty or congested. Alternatively, if a sounding signal is sent to the storage node in which the target storage address is located, and feedback that is specific to the sounding signal and that is sent by the storage node in which the storage address is located is not received in a preset time period, it may be determined that the access path of the storage node in which the target storage address is located is faulty or congested.

It should be further understood that the step of determining that the access path of the storage node in which the target storage address is located is faulty or congested may be performed before step 430 and after step 420, or may be performed between step 420 and step 410. A time of performing this step is not limited in this embodiment of this application.

Correspondingly, after the host sends the data processing request to the first storage node, the first storage node 210 may perform the following operations.

440. The first storage node 210 receives the data processing request to access the storage device 314 of the second storage node 310, where the data processing request carries a target storage address of to-be-processed data.

The data processing request may be at least one of the following requests: an IO request used to access a target storage address, a GC request used to perform garbage collection (GC) among storage nodes in a storage system, a load balancing request, or a deduplication and compression request.

It should be understood that the to-be-processed data may be carried in the data processing request, or the to-be-processed data may be stored at the target storage address.

450. The first storage node 210 determines the second storage node 310 based on the target storage address of the to-be-processed data.

Optionally, in an embodiment, the target storage address includes an identifier of the second storage node 310 and a logical address that is in the storage device 314 of the second storage node 310 and that is used to store the to-be-processed data.

Specifically, the first storage node 210 may directly determine, based on the identifier of the second storage node 310 that is carried in the data processing request, which storage node in the storage system is the second storage node 310.

It should be understood that an identifier of the storage node in which the target storage address is located may be an IP address of the storage node, or a number allocated by the host to each storage node in the storage system, and the number of each storage node is used to uniquely identify one storage node. This is not specifically limited in this embodiment of this application.

Optionally, in an embodiment, the storage system includes a plurality of storage nodes, and storage address ranges corresponding to different storage nodes in the plurality of storage nodes are not overlapped. Step 450 further includes: determining, by the first storage node 210 based on the target storage address, a storage address range to which the target storage address belongs, and determining, by the first storage node 210, the second storage node 310 based on the storage address range to which the target storage address belongs and a correspondence between a storage address range in the storage system and a storage node in the storage system.

Specifically, storage address ranges corresponding to storage devices in different storage nodes in the storage system are not overlapped. In other words, each storage address range can correspond to only one storage node. Therefore, the first storage node 216 may directly determine, based on the storage address range to which the target storage address belongs, the storage node in which the storage address in the data processing request is located.

Optionally, in an embodiment, the storage system includes a plurality of storage nodes, and identifiers of storage devices in different storage nodes in the plurality of storage nodes are different. The data processing request carries an identifier of a storage device in which the target storage address of the to-be-processed data is located. Step 450 further includes: determining, by the first storage node 210 based on the target storage address, a storage device corresponding to the target storage address, and determining, by the first storage node 210, the second storage node 310 based on an identifier of the storage device corresponding to the target storage address and a correspondence between an identifier of a storage device and a storage node in the storage system.

It should be understood that the identifier of the storage device may be a number of the storage device in which the target storage address is located. For example, when the storage device is an SSD drive, the storage address may include a drive letter of the SSD drive in which the target storage address is located. For another example, when the storage device is an SSD drive, the storage address may include an IP address of the SSD drive in which the target storage address is located. For another example, when the storage device is an SSD drive, the storage address may include a storage device address of the SSD drive in which the target storage address is located.

460. The first storage node 210 sends the data processing request to the second storage node 310 by using the second network interface card 216, where the data processing request instructs the second storage node 310 to process the to-be-processed data.

It should be noted that the data processing request may be processed by using the processing unit 212 in the first storage node 210, and the processed data processing request is sent by the second network interface card 216 of the first storage node 210 to the second network interface card 316 of the second storage node 310, to access the storage device 314 of the second storage node 310.

Alternatively, the data processing request may be sent to the second network interface card 216 in the first storage node 210 by using a processing unit 212 in the first storage node 210. In this case, the processing unit 212 in the first storage node 210 may not process the data processing request, and the second network interface card 216 in the first storage node 210 sends the data processing request to the second storage node 310, to access the storage device 314 in the second storage node 310.

To further learn the method for transmitting a data processing request in this embodiment of this application, a data access scenario and a data migration scenario are used as examples for detailed description below.

Figure 5:
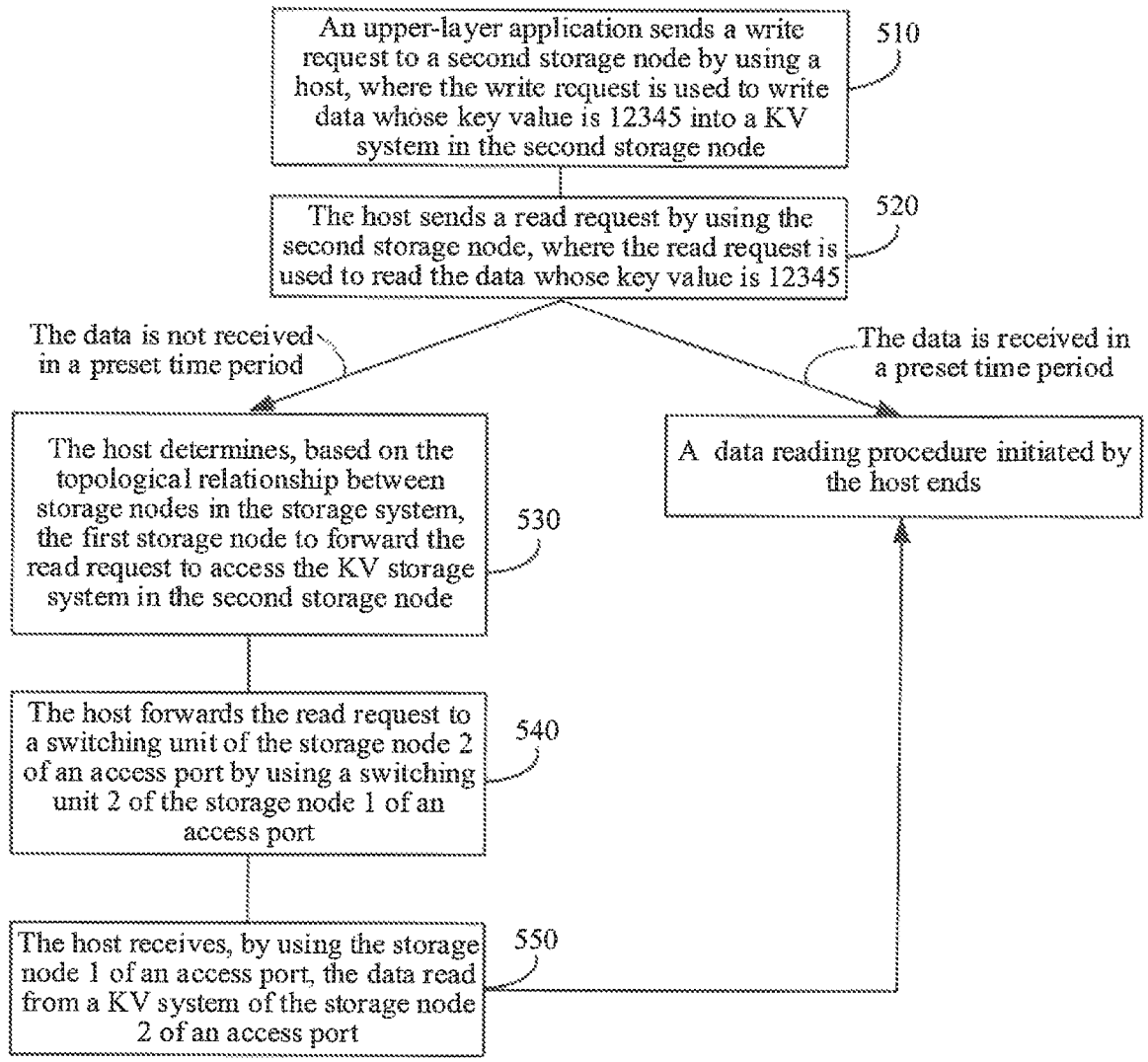
FIG. 5 is a schematic flowchart of a method for transmitting a data processing request in a data access scenario according to an embodiment of this application.

FIG. 5 is a schematic flowchart of a method for transmitting a data processing request in a data access scenario according to an embodiment of this application. The method shown in FIG. 5 includes the following steps.

510. An upper-layer application sends a write request to the second storage node 310 by using a host, where the write request is used to write data whose key value is 12345 into a KV system in the second storage node 310.

Specifically, the upper-layer application sends the write request to the second storage node 310 by using the host, to write the data whose key value is 12345 to the KV storage system in the second storage node 310 through an access path in the second storage node 310.

520. The host sends a read request to the second storage node 310, where the read request is used to read the data whose key value is 12345 in the second storage node 310.

Specifically, if the host does not receive, in a preset time period, the data requested by the read request, step 530 to step 550 are performed. If the host receives, in a preset time period, the data requested by the read request, a data reading procedure initiated by the host ends.

530. The host determines, based on a topological relationship between storage nodes in a storage system, that a KV storage system in the second storage node 310 may be accessed through an access path in the first storage node 210.

Specifically, the read request may be sent to the switching unit 313 of the second storage node 310 by using the switching unit 213 of the first storage node 210, to access the KV storage system of the second storage node 310.

It should be noted that step 530 may be performed when the host is initialized, or may be performed after the host performs step 520. A time of performing step 530 is not specifically limited in this embodiment of this application.

540. The host forwards the read request to the switching unit 313 of the second storage node 310 by using the switching unit 213 of the first storage node 210.

550. The host receives, by using the first storage node 210, the data read from the KV storage system of the second storage node 310.

Specifically, the data whose key value is 12345 is returned from the KV storage system of the second storage node 310 to the host. The data may be forwarded to the switching unit 213 of the first storage node 210 by using the switching unit 313 of the second storage node 310, and is finally returned to the host from the first storage node 210, so that a current process of reading data by the host is completed.

Figure 6:
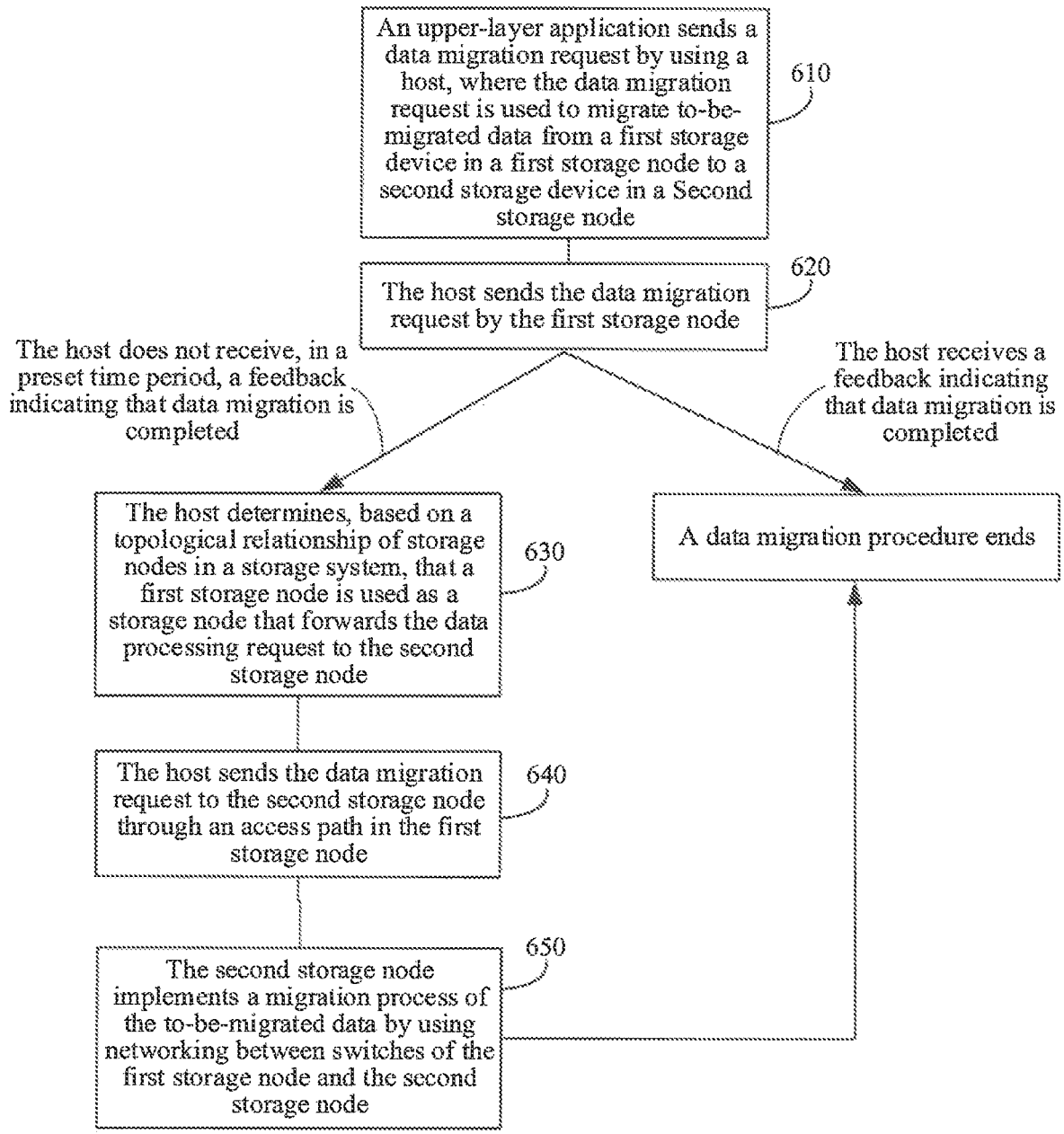
FIG. 6 is a schematic flowchart of a method for transmitting a data processing request in a data migration scenario according to an embodiment of this application.

FIG. 6 is a method applied to the storage system shown in FIG. 3. As described in FIG. 3, a second network interface card in a storage node may be located in a switching unit of the storage node.

FIG. 6 is a schematic flowchart of a method for transmitting a data processing request in a data migration scenario according to an embodiment of this application. The method shown in FIG. 6 includes the following steps.

610. An upper-layer application sends a data migration request by using a host, where the data migration request is used to migrate to-be-migrated data from the storage device 214 in the first storage node 210 to the storage device 314 in the second storage node 310.

Specifically, the data migration request may carry a storage address of the storage device 214 and a storage address of the storage device 314.

620. The host sends the data migration request to the first storage node 210.

Specifically, if the host does not receive, in a preset time period, feedback information indicating that data migration succeeds, step 630 to step 650 are performed. If the host receives, in a preset time period, feedback information indicating that data migration succeeds, the data migration procedure ends.

It should be noted that, when the host does not receive, in the preset time period, the feedback information indicating that data migration succeeds, it may indicate that the host receives feedback information indicating that the data migration fails, or the host receives, in the preset time period, neither the feedback information indicating that the data migration succeeds, nor the feedback information indicating that the data migration fails.

630. The host determines, based on a topological relationship between storage nodes in a storage system, that the first storage node 210 is used as a storage node that forwards the data processing request to the second storage node 310.

Specifically, the host determines that the first storage node 210 adjacent to the second storage node 310 in the storage system is used as the storage node that forwards the data processing request to the second storage node 310. To be specific, the data migration request is sent to the switching unit 313 in the second storage node 310 through an access path in the first storage node 210, so that the switching unit 313 in the second storage node 310 sends the data migration request to the storage device 314 in the second storage node 310.

It should be noted that step 630 may be performed when the host is initialized, or may be performed after the host performs step 620. A time of performing the step 630 is not specifically limited in this embodiment of this application.

640. The host sends the data migration request to the second storage node 310 through the access path in the first storage node 210.

Specifically, the host first sends the data migration request to the first storage node 210, after processing the data migration request, the first storage node 210 sends the data migration request to the switching unit 313 in the second storage node 310 by using networking between the switching unit 213 and switching unit 313.

650. The second storage node 310 implements a migration process of the to-be-migrated data by using networking between the switching unit 213 and switching unit 313.

It should be noted that, when the to-be-migrated data is transmitted by using the networking between the switching unit 213 and switching unit 313, if the processing unit 210 in the second storage node 212 is not required to calculate the data, the to-be-migrated data may be directly sent from the storage device 214 in the first storage node 210 to the storage device 314 in the second storage node 310. If the processing unit 212 in the first storage node 210 is required to calculate the data, the to-be-migrated data may be processed by using the microprocessor 215 in the first storage node 210, and the processed data is sent to the second storage node 310 by using a second network interface card 216 in the first storage node 210.

A process of processing the to-be-migrated data by using the microprocessor 215 of the first storage node is the same as a conventional process of calculating the to-be-migrated data by using the processing unit 212 of the first storage node 210. Details are not described herein again.

It should be further understood that, in the method shown in FIG. 6, only the data migration request transmission method used when the access path in the second storage node 310 is faulty or congested is listed. This embodiment of this application may further be applied to a data migration request transmission method used after an access path in the first storage node 210 is faulty or congested. Because transmission manners are basically the same, details are not described herein again for brevity.

Methods for transmitting a data processing request in the embodiments of this application are described above in detail with reference to FIG. 1 to FIG. 6. Apparatuses for transmitting a data processing request in the embodiments of this application are briefly described below with reference to FIG. 7 to FIG. 10. It should be understood that apparatuses shown in FIG. 7 to FIG. 10 may implement the methods described above. For brevity, details are not described herein again.

Figure 7:
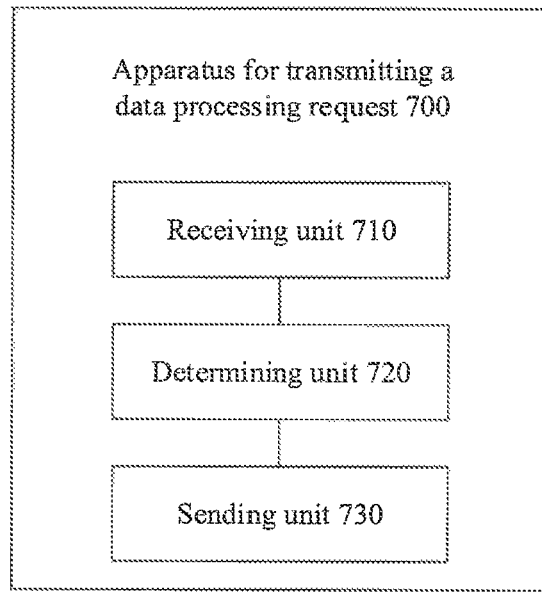
FIG. 7 is a schematic block diagram of an apparatus for transmitting a data processing request according to an embodiment of this application.

FIG. 7 is a schematic block diagram of an apparatus for transmitting a data processing request according to an embodiment of this application. An apparatus 700 for transmitting a data processing request that is shown in FIG. 7 includes a receiving unit 710, a determining unit 720, and a sending unit 730. The apparatus 700 may be applied to a storage system. The storage system includes a first storage node and a second storage node. A storage device in the first storage node is connected to a host by using a processor and a first network interface card of the first storage node, and is connected to a storage device of the second storage node by using a second network interface card.

The receiving unit 710 is configured to receive a data processing request to access the storage device of the second storage node, where the data processing request carries a target storage address of to-be-processed data.

The determining unit 720 is configured to determine the second storage node based on the target storage address of the to-be-processed data.

The sending unit 730 is configured to send the data processing request to the second storage node by using the second network interface card, where the data processing request instructs the second storage node to process the to-be-processed data.

Optionally, in an embodiment, the target storage address includes an identifier of the second storage node and a logical address that is in the storage device of the second storage node and that is used to store the to-be-processed data.

Optionally, in an embodiment, the storage system includes a plurality of storage nodes, and storage address ranges corresponding to different storage nodes in the plurality of storage nodes are not overlapped. That the determining unit 720 is further configured to determine the second storage node based on the target storage address of the to-be-processed data includes the following: the determining unit 720 is further configured to determine, based on the target storage address, a storage address range to which the target storage address belongs; and the determining unit 720 is further configured to determine the second storage node based on the storage address range to which the target storage address belongs and a correspondence between a storage address range in the storage system and a storage node in the storage system.

Optionally, in an embodiment, the receiving unit 710 is further configured to receive the correspondence that is between a storage address range in the storage system and a storage node in the storage system and that is sent by the host.

In an optional embodiment, the receiving unit and the sending unit may be a transceiver 840, the determining unit 720 may be a processor 820, and the apparatus for transmitting a data processing request may further include an input/output interface 830 and a memory 810. Details are shown in FIG. 8.

Figure 8:
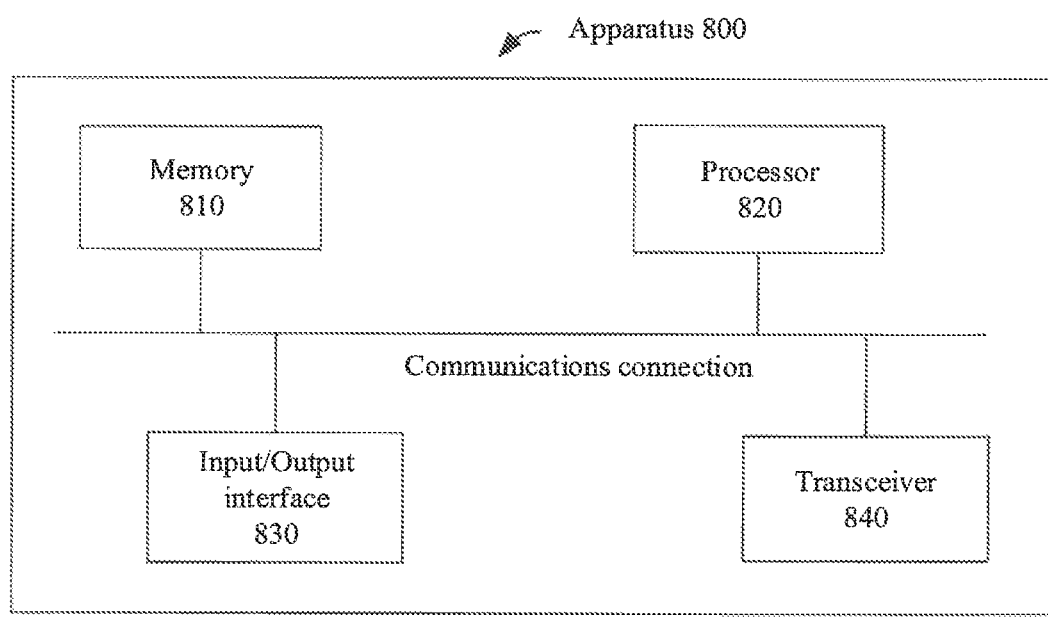
FIG. 8 is a schematic block diagram of an apparatus for transmitting a data processing request according to another embodiment of this application.

FIG. 8 is a schematic block diagram of an apparatus for transmitting a data processing request according to another embodiment of this application. The apparatus 800 shown in FIG. 8 may include a memory 810, a processor 820, an input/output interface 830, and a transceiver 840. The memory 810, the processor 820, the input/output interface 830, and the transceiver 840 are connected through an internal connection path. The memory 810 is configured to store an instruction. The processor 820 is configured to execute the instruction stored in the memory 810, to control the input/output interface 830 to receive input data and information, or output data such as an operation result, and control the transceiver 840 to send a signal.

The transceiver 840 is configured to receive a data processing request to access a storage device of the second storage node, where the data processing request carries a target storage address of to-be-processed data.

The processor 820 is configured to determine the second storage node based on the target storage address of the to-be-processed data.

The transceiver 840 is configured to send the data processing request to the second storage node by using the second network interface card, where the data processing request instructs the second storage node to process the to-be-processed data.

It should be understood that, in this embodiment of this application, the processor 820 may be a general-purpose central processing unit (CPU), a microprocessor, an application specific integrated circuit (ASIC), or one or more integrated circuits, and is configured to execute a related program, to implement the technical solutions provided in the embodiments of this application.

It should be further understood that the transceiver 840 is also referred to as a communications interface, and a transceiver apparatus, for example, but not limited to, a transceiver, is used to implement communication between the apparatus 800 and another device or a communications network.

The memory 810 may include a read-only memory and a random access memory, and provide an instruction and data to the processor 820. A part of the processor 820 may further include a non-volatile random access memory. For example, the processor 820 may further store information of a device type.

In an implementation process, steps in the foregoing methods can be implemented by using a hardware integrated logical circuit in the processor 820, or by using instructions in a form of software. The method for transmitting a data processing request disclosed with reference to the embodiments of this application may be directly performed by a hardware processor, or may be performed by using a combination of hardware and a software module in the processor. A software module may be located in a mature storage medium in the art, such as a random access memory, a flash memory, a read-only memory, a programmable read-only memory, an electrically erasable programmable memory, a register, or the like. The storage medium is located in the memory 810, and a processor 820 reads information in the memory 810 and completes the steps in the foregoing methods in combination with hardware of the processor. To avoid repetition, details are not described herein again.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, a discrete gate or transistor logical device, a discrete hardware component, or the like. The general purpose processor may be a microprocessor, or the processor may be any conventional processor or the like.

Figure 9:
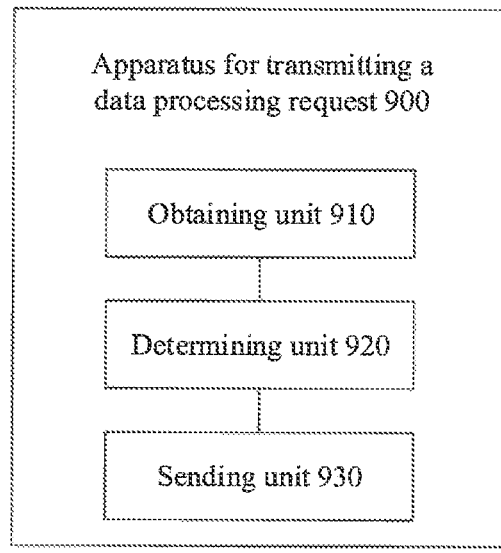
FIG. 9 is a schematic block diagram of an apparatus for transmitting a data processing request according to an embodiment of this application.

FIG. 9 is a schematic block diagram of an apparatus for transmitting a data processing request according to an embodiment of this application. The apparatus 900 shown in FIG. 9 may be applied to a host, where the host is connected to a storage system, the storage system includes at least two storage nodes, each storage node is connected to the host by using a first network interface card, and is connected to another storage node by using a second network interface card, and the apparatus includes:

an obtaining unit 910, configured to obtain a topological relationship of storage nodes connected by using the second network interface card in the storage system;

a determining unit 920, configured to: when a preset condition is detected, determine a first storage node in the at least two storage nodes based on the topological relationship, where the host accesses a second storage node by using the first storage node; and a sending unit 930, configured to send, to the first storage node, a data processing request used to access a storage device of the second storage node.

Optionally, in an embodiment, the sending unit 930 is further configured to:

send a correspondence between a storage address range in the storage system and a storage node in the storage system to the first storage node.

In an optional embodiment, the obtaining unit 910 and the sending unit 930 may be a transceiver 1040, the determining unit 920 may be a processor 1020, and the apparatus for transmitting a data processing request may further include an input/output interface 1030 and a memory 1010. Details are shown in FIG. 10.

Figure 10:
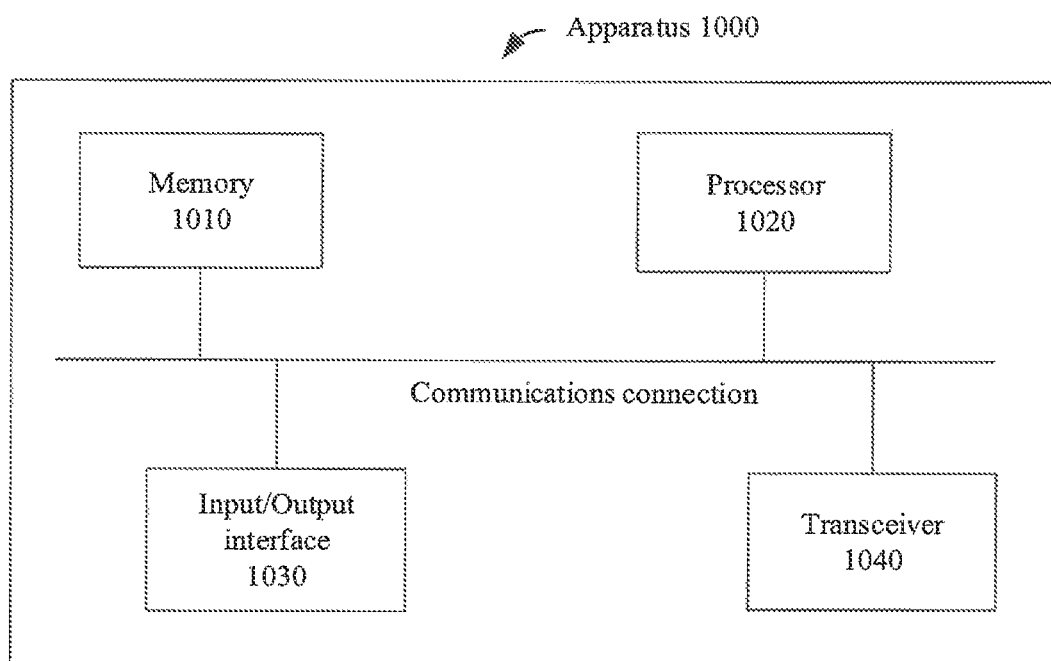
FIG. 10 is a schematic block diagram of an apparatus for transmitting a data processing request according to another embodiment of this application.

FIG. 10 is a schematic block diagram of an apparatus for transmitting a data processing request according to another embodiment of this application. The apparatus 1000 shown in FIG. 10 may include a memory 1010, a processor 1020, an input/output interface 1030, and a transceiver 1040. The memory 1010, the processor 1020, the input/output interface 1030, and the transceiver 1040 are connected through an internal connection path. The memory 1010 is configured to store an instruction. The processor 1020 is configured to execute the instruction stored in the memory 1010, to control the input/output interface 1030 to receive input data and information, or output data such as an operation result, and control the transceiver 1040 to send a signal.

The transceiver 1040 is configured to obtain a topological relationship of storage nodes connected by using a second network interface card in the storage system.

The processor 1020 is further configured to: when a preset condition is detected, determine a first storage node in the at least two storage nodes based on the topological relationship, where the host accesses a second storage node by using the first storage node.

The transceiver 1040 is configured to send, to the first storage node, a data processing request used to access a storage device of the second storage node.

It should be understood that, in this embodiment of this application, the processor 1020 may be a general-purpose central processing unit (CPU), a microprocessor, an application-specific integrated circuit (ASIC), or one or more integrated circuits, and is configured to execute a related program, to implement the technical solutions provided in the embodiments of this application.

It should be further understood that the transceiver 1040 is also referred to as a communications interface, and a transceiver apparatus, for example, but not limited to, a transceiver, is used to implement communication between the apparatus 1000 and another device or a communications network.

The memory 1010 may include a read-only memory and a random access memory, and provide an instruction and data to the processor 1020. A part of the processor 1020 may further include a non-volatile random access memory. For example, the processor 1020 may further store information of a device type.

In an implementation process, steps in the foregoing methods can be implemented by using a hardware integrated logical circuit in the processor 1020, or by using instructions in a form of software. The method for transmitting a data processing request disclosed with reference to the embodiments of this application may be directly performed by a hardware processor, or may be performed by using a combination of hardware and a software module in the processor. A software module may be located in a mature storage medium in the art, such as a random access memory, a flash memory, a read-only memory, a programmable read-only memory, an electrically erasable programmable memory, a register, or the like. The storage medium is located in the memory 1010, and the processor 1020 reads information in the memory 1010 and completes the steps in the foregoing methods in combination with hardware of the processor. To avoid repetition, details are not described herein again.

It should be understood that the processor in the embodiments of this application may be a central processing unit (CPU), or may further be another general purpose processor, a digital signal processor (DSP), an application-specific integrated circuit (ASIC), a field programmable gate array (FPGA), or another programmable logical device, a discrete gate or transistor logical device, a discrete hardware component, or the like. The general purpose processor may be a microprocessor, or the processor may be any conventional processor or the like.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, a magnetic tape), an optical medium (for example, a digital versatile disc (DVD)), or a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a data processing request, applied to a first storage node, wherein the first storage node is connected to a host by using a first network interface card of the first storage node, and is connected to a second storage node by using a second network interface card of the first storage node, the method comprising:
receiving the data processing request from the host, via a first network, by using the first network interface card, wherein the data processing request carries a target storage address of to-be-processed data;
determining the second storage node based on the target storage address of the to-be-processed data;
determining whether an access path in the second storage node to a storage device in the second storage node is faulty or congested prior to receiving the data processing request from the host, via the first network, by using the first network interface card; and
switching the access path in the second storage node to an access path in the first storage node to the second storage device in the second storage node by sending the data processing request to the second storage node, via a second network different from the first network, by using the second network interface card, wherein the data processing request instructs the second storage node to process the to-be-processed data.

2. The method according to claim 1, wherein the target storage address comprises an identifier of the second storage node and a logical address that is in storage device of the second storage node and that is used to store the to-be-processed data.

3. The method according to claim 1, wherein the first storage node and the second storage node belong to a storage system, and there is no overlap between storage address ranges of the first storage node and the second storage node; and
the determining the second storage node based on the target storage address of the to-be-processed data comprises:
determining, based on the target storage address, a storage address range to which the target storage address belongs; and
determining the second storage node based on the storage address range to which the target storage address belongs and a correspondence between the storage address range and the second storage node-.

4. The method according to claim 3, wherein the method further comprises:
receiving, by the first storage node, the correspondence between the storage address range and the second storage node, the correspondence being sent by the host.

5. The method of claim 1, wherein the second network interface card is a host bus adapter (HBA), a network adapter, an Ethernet network interface card, a Fibre Channel (FC) network interface card, or an Internet Small Computer System Interface (ISCSI) network interface card.

6. The method of claim 1, wherein the determining whether the access path to the storage device in the second storage node is faulty comprises:
receiving the data processing request from the host by the second storage node;
determining, by the host that feedback that is specific to the data processing request and that is sent to the second storage node is not received in a preset time period; and
determining that the access path to the storage device in the second storage path is faulty in response to the feedback not being received in the preset time period.

7. The method of claim 1, wherein the determining whether the access path to the storage device in the second storage node is faulty comprises:
sending, using an upper-layer application, a write request to the second storage node by using the host, where the write request is used to write data into a key value (KV) system through the access path in the second storage node;
sending, using the host, a read request to the second storage node, where the read request is used to read the write data in the second storage node; and
determining, in response to the host does not receive, in a preset time period, the data requested by the read request, that the access path to the storage device in the second storage path is faulty.

8. The method of claim 1, wherein the data processing request is at least one of the following requests: an IO request used to access a target storage address, a garbage collections (GC) request used to perform garbage collection (GC) among storage nodes in a storage system, a load balancing request, or a deduplication and compression request.

9. The method of claim 1, wherein the host forwards data processing request to a switching unit of the second storage node using a switching unit 213 of the first storage node.

10. The method of claim 1, wherein when to-be-migrated data is transmitted by using the networking between the switching unit of the first storage node and the switching unit of the second storage node:
in response to a processing unit in the second storage node is not required to calculate the data, the to-be-migrated data is directly sent from the storage device in the first storage node to the storage device in the second storage node; and
in response to the processing unit in the first storage node is required to calculate the data, the to-be-migrated data is processed by using a processor in the first storage node, and the processed data is sent to the second storage node by using the second network interface card in the first storage node.

11. A first storage node connected to a host by using a first network interface card of the first storage node, and is connected to a second storage node by using a second network interface card of the first storage node, and the first storage node comprises:
a memory storing instructions; and
a processor coupled to the memory to execute the instructions to:
receive a data processing request from the host, via a first network, by using the first network interface card, wherein the data processing request carries a target storage address of to-be-processed data;

determine the second storage node based on the target storage address of the to-be-processed data;

determine whether an access path in the second storage node to a storage device in the second storage node is faulty or congested prior to receiving the data processing request from the host, via the first network, by using the first network interface card;

switch the access path in the second storage node to an access path in the first storage node to the second storage device in the second storage node by sending the data processing request to the second storage node, via a second network different from the first network, by using the second network interface card, wherein the data processing request instructs the second storage node to process the to-be-processed data.

12. The first storage node according to claim 11, wherein the target storage address comprises an identifier of the second storage node and a logical address within storage device of the second storage node and that is used to store the to-be-processed data.

13. The first storage node according to claim 12, wherein:
the first storage node and the second storage node belong to a storage system, and there is no overlap between storage address ranges of the first storage node and the second storage node; and
when performing the operation of determining the second storage node based on the target storage address of the to-be-processed data, the processor is further configured to:
determine, based on the target storage address, a storage address range to which the target storage address belongs; and
determine the second storage node based on the storage address range to which the target storage address belongs and a correspondence between the storage address range and the second storage node.

14. The first storage node according to claim 13, wherein the processor is further configured to:
receive the correspondence that is between the storage address range and the second storage node, the correspondence being sent by the host.

15. A host connected to a first storage node, the host comprising:
a memory storing instructions; and
a processor coupled to the memory to execute instructions to:
generate a data processing request for accessing a second storage node;
determine the first storage node that connects to the second storage node via a second network, using second interface card of the first storage node;
determining whether an access path in the second storage node to a storage device in the second storage node is faulty or congested;
switching the access path in the second storage node to an access path in the first storage node to the second storage device in the second storage node by sending the data processing request to the first storage node via a first network different from the second network, using a first interface card of the first storage node.

16. The host according to claim 15, wherein the processor is further configured to:
send a correspondence between a storage address range and the second storage node to the first storage node.

* * * * *